United States Patent [19]
Kuo

[11] Patent Number: 5,498,058
[45] Date of Patent: Mar. 12, 1996

[54] AIR CURRENT GUIDING DEVICE A PICKUP

[76] Inventor: Chen-Hsiung Kuo, 93 Chung-Chen Road, Tainan, Taiwan

[21] Appl. No.: 274,033

[22] Filed: Jul. 12, 1994

[51] Int. Cl.$^6$ .................................................. B62D 35/00
[52] U.S. Cl. ........................................ 296/180.1; 296/37.6
[58] Field of Search .............................. 296/180.1, 37.6, 296/50, 57.1

[56] References Cited

U.S. PATENT DOCUMENTS

| | | | |
|---|---|---|---|
| 4,585,263 | 4/1986 | Hesner | 296/180.1 |
| 5,232,259 | 8/1993 | Booker | 296/180.1 X |

*Primary Examiner*—Andrew C. Pike

[57] ABSTRACT

A air current guiding device for pickups comprises a main guiding plate curved up from a front to a rear, two extension plates movably combined with two opposite sides of the main guiding plate for adjusting the width of this device to conform to that of a pickup which this device is used for, a locking plate fixed below the main guiding plate, a rear cover plate hinged with the locking plate and possible to be swung open, a block with a threaded hole fixed at an middle point of an inner side of each extension plate, and an adjusting member including a threaded rod, a spring and a stop to be combined with the block fitting in a sliding groove in each of the two opposite sides of the main guiding plate to move the extension plate to change the width of this device.

3 Claims, 7 Drawing Sheets

5,498,058

AIR CURRENT GUIDING DEVICE A PICKUP

BACKGROUND OF THE INVENTION

This invention concerns an air current guiding device for a pickup, which is detachably arranged on a pickup bed floor and coextensively between side walls thereof in adjacency to a tailgate of a pickup bed floor. The subject matter of the invention is able to prevent air current from colliding with a tailgate of a pickup and divert air current upwardly and sidewardly by passing through a main curved guiding plate.

A pickup, as shorn in FIG. 1, has a freight area 1 with neither roofs nor covers, and so air current will flow colliding with a tailgate 10 which forms a hampering wall against air current and slows down a pickup during high speed running. Besides wasting gasoline, air current or wind will also cause a pickup to run unstably due to swaying.

SUMMARY OF THE INVENTION

This invention is a device with a simple structure to be assembled, mounted on or taken off easily, which is used on a pickup to divert air current in directions upwardly and sidewardly.

The present invention comprises a main curved guiding plate, two extension plates which are movably combined with two opposite sides of the main curved guiding plate for adjusting the width of the invention to conform to that of a pickup, a locking plate which is located below the main curved guiding plate, and a rear cover plate which is pivoted with said locking plate and is able to be pulled open. Said main curved guiding plate consists of two opposite grooves which are aligned with each other on its rear surface for a respective block to be fixed on the intermediate portion of an inner side of each said extension plate by sliding and fitting therein. Each of two adjusting members consists of a threaded rod, a stop, and a spring which fit each other through a respective screw hole of said block which can be fixed tightly on or released from the main curved guiding plate depending on the location of each said extension plate.

FIE. 3 is a perspective view of the first embodiment of the present invention.

Figure 4:
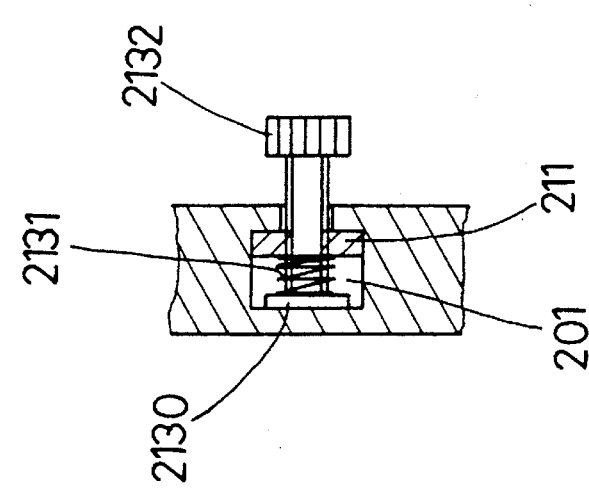

FIG. 4 is a cross-sectional view illustrating each adjusting member in a tightly screwed condition in the first embodiment of the present invention.

Figure 5:
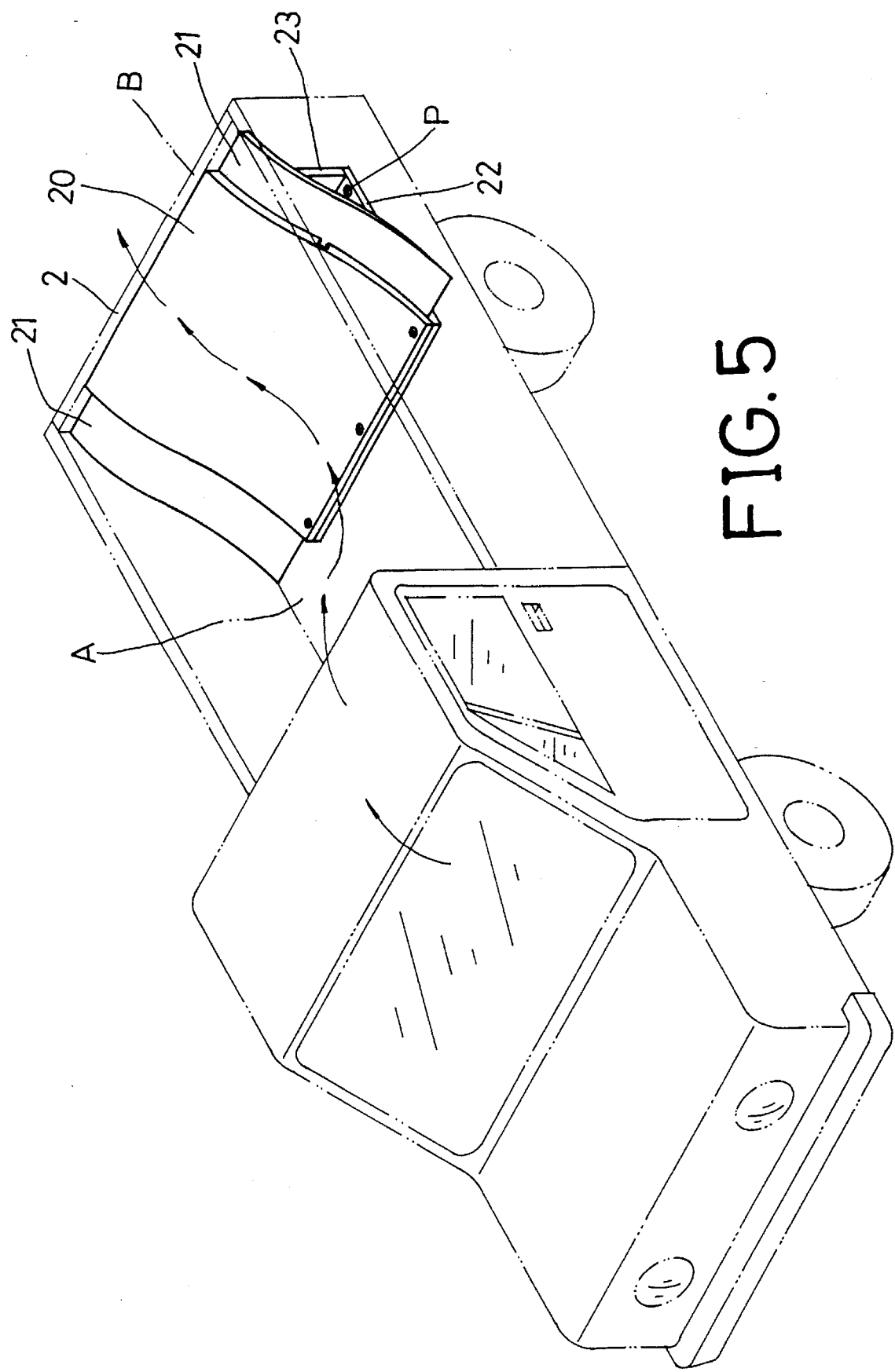

FIG. 5 is a perspective view illustrating the device utilized in a pickup in the first embodiment of the present invention.

Figure 6:
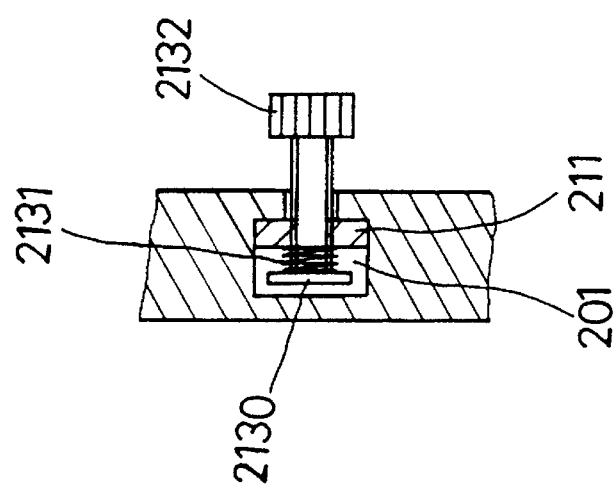

FIG. 6 is a cross-sectional view illustrating each adjusting member in a released condition in the first embodiment of the present invention.

Figure 7:
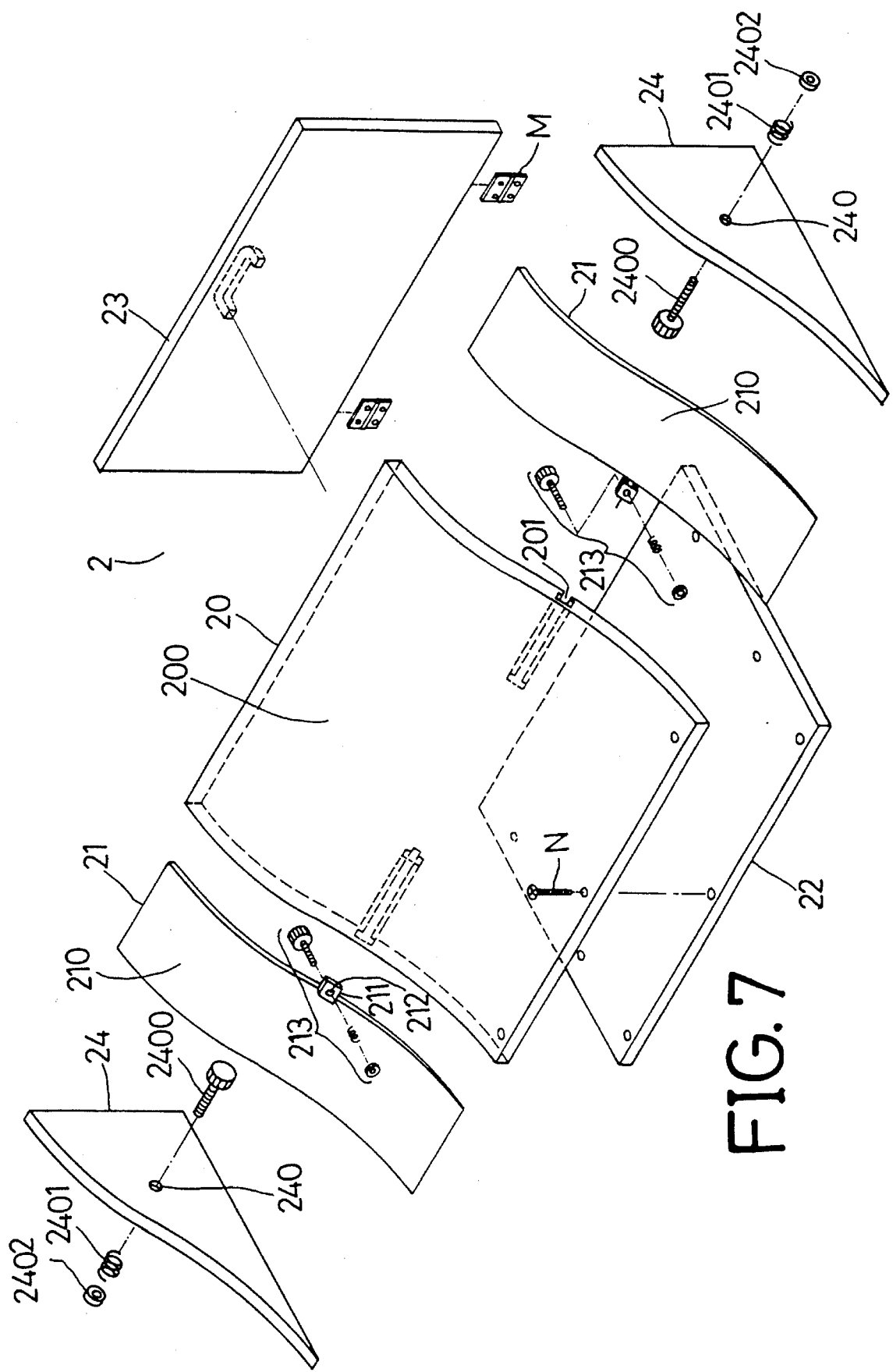

FIG. 7 is an exploded perspective view of the second embodiment of the present invention.

Figure 8:
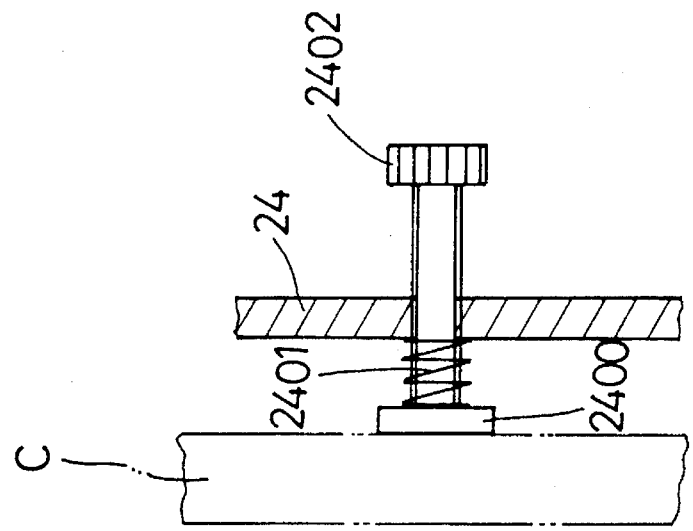

FIG. 8 is a cross-sectional view illustrating each side plate locked against each side wall of a pickup.

Figure 9:
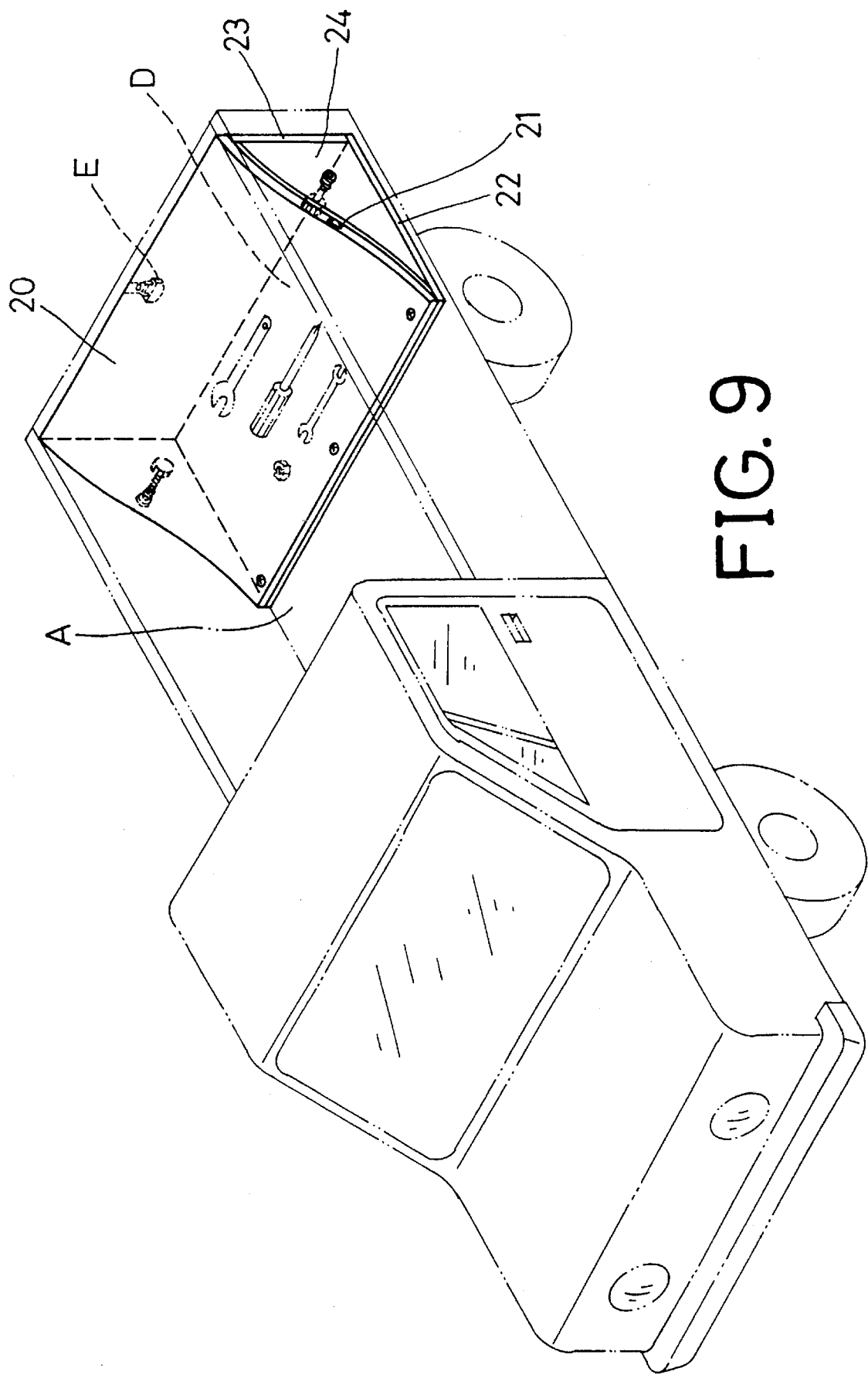

FIG. 9 is a perspective view of the second embodiment of the present invention.

DETAILED DESCRIPTION OF THE INVENTION

Figure 1:
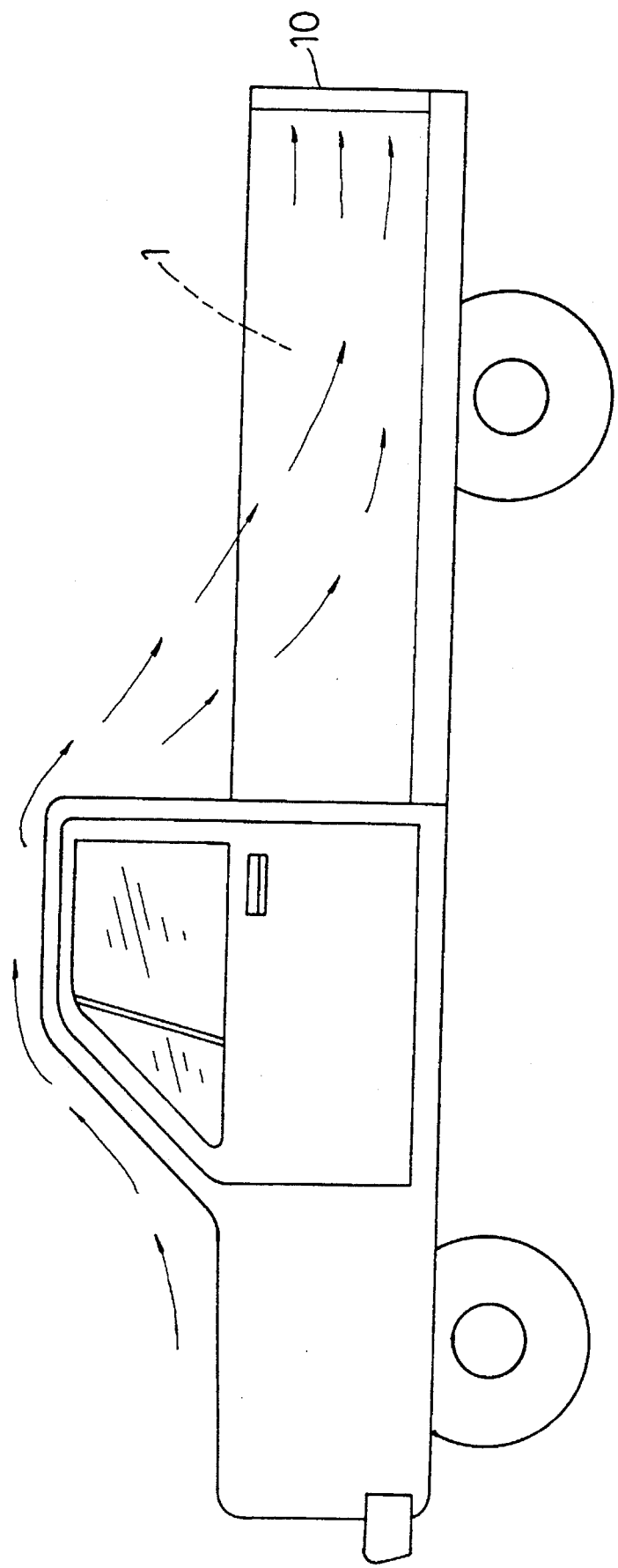
FIG. 1 is a diagram of air current direction of a pickup in running condition.
Figure 2:
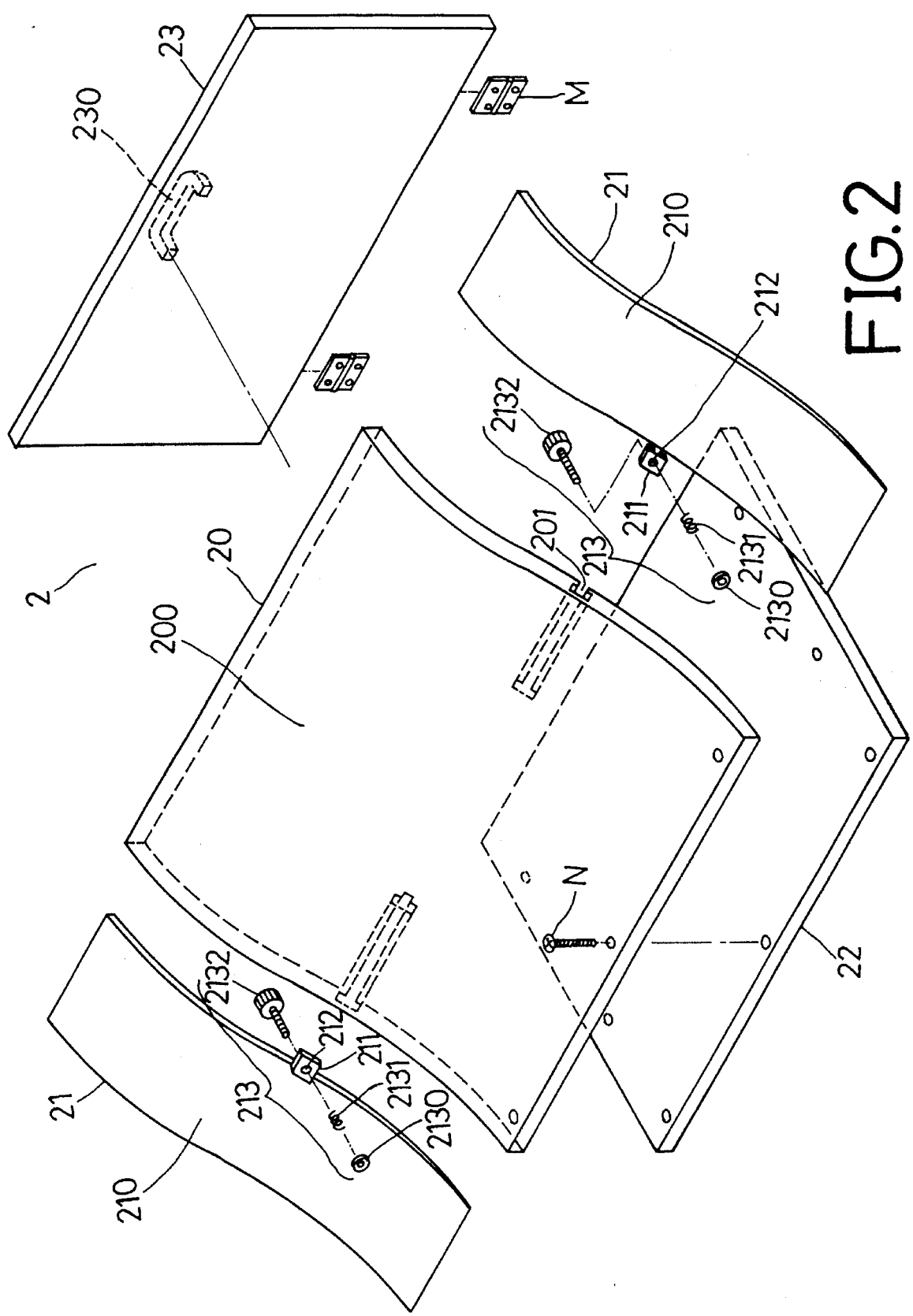
FIG. 2 is an exploded perspective view of the first embodiment of the present invention.
Figure 3:
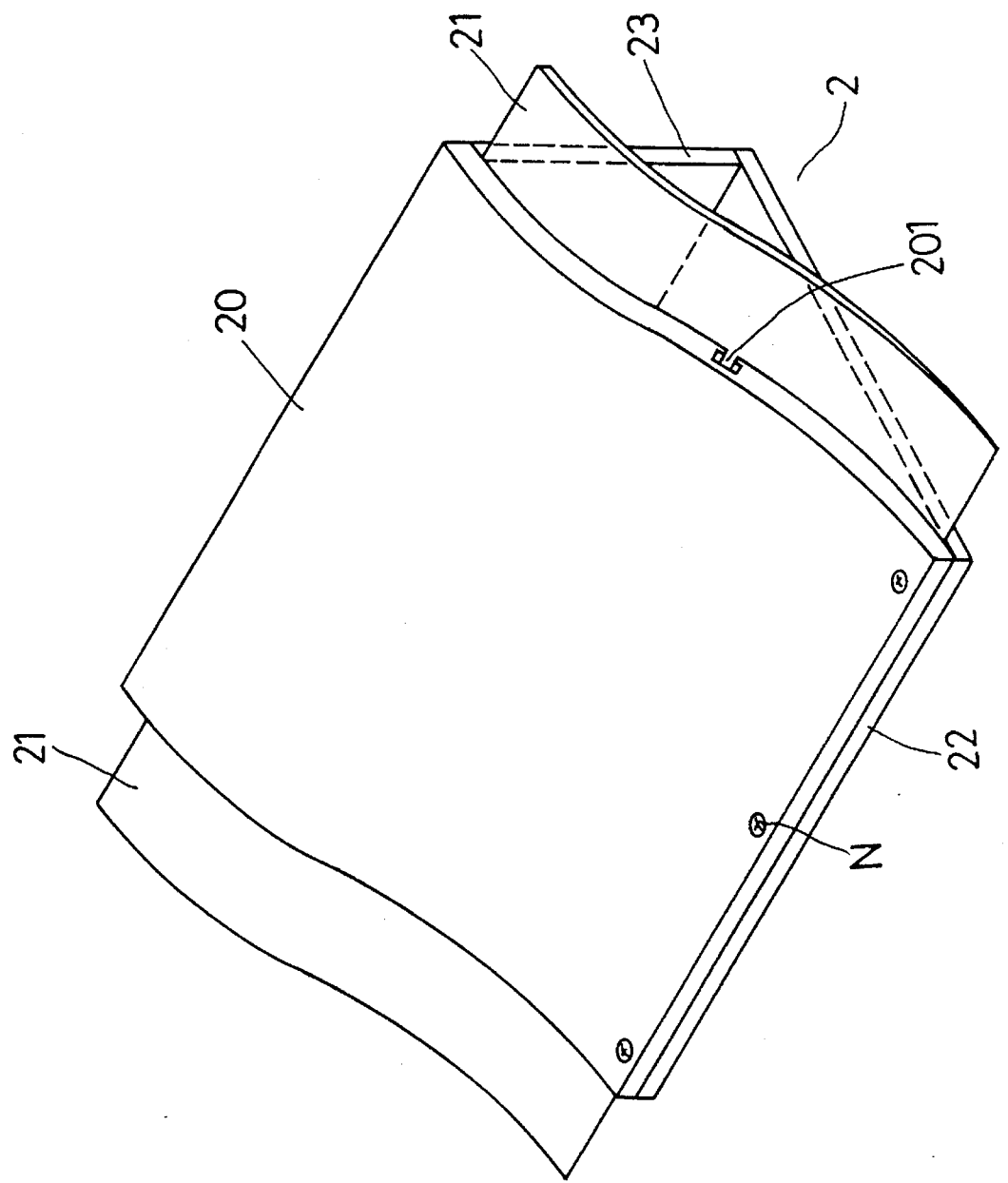

An air current guiding device 2 for a pickup, as shown in FIGS. 2 and 3, comprises mainly a main curved guiding plate 20, two extension plates 21, a locking plate 22, and a rear cover plate 23.

The main curved guiding plate 20 consists of a curved upper smooth surface 200, and two opposite straight grooves 201 which are aligned with each other behind said curved upper smooth surface 200 for a respective block 211 to move and fit therein. The two extension plates 21, comprising respectively a curved upper smooth surface 210 and a block 211 including respectively a screw hole 212, connect with said main curved guiding plate 20 by sliding respectively a block 211 into a straight groove 201 for securing. A respective adjusting member 213 consists of a stop 2130, a spring 2131, and a threaded rod 2132 for fitting each other engaged through said screw hole 212.

The locking plate 22 placed below the main curved guiding plate 20 is fixed firmly on a bed floor of a pickup.

The rear cover plate 23 combined with the rear edge of the locking plate 22 by two pivots has a grip 230 on its outer side.

In assembling the present invention firstly, two threaded rods 2132 are screwed respectively to engage a screw hole 212 of an extension plate 21 and next, a spring 2131 and a stop 2130 are attached on each said threaded rod 2132. Then said extension plates 21 are combined with the opposite sides of the main curved guiding plate 20 by sliding respectively a block 211 into a straight groove 201 as shown in FIG. 4. Finally, said main curved guiding plate 20 is fixed on a locking plate 22 with a screw N and a rear cover plate 23 is connected with said locking plate 22 by two pivots M. After the above stages are finished, the air current guiding device is wholly assembled.

In using, as shown in FIG. 5, the whole device 2 in secured on a bed floor A of a pickup by two screws P, and the rear cover plate 23 is combined vertically and tightly with a tailgate B of a pickup. Next, the two extension plates 21 are moved for adjusting the width of the device depending on that of the pickup. In adjusting, as shown in FIG. 6, to conform to the width of the device, two threaded rods 2132 are released to move two stops 2130 back to slide said extension plates 21 inwardly or outwardly relative to the main curved guiding plate 20 to a proper position and then are screwed tightly for securing the extension plates 21.

When a pickup assembled with this device 2 is running in high speed, a curved smooth surface 200 of the main curved guiding plate 20 and the curved smooth surfaces 210 of the extension plates 21 will divert air current flowing along the pickup with no hampering force and thus reduce gasoline mileage and stabilize the whole pickup for safety. While detaching the device 2 from the bed floor A, the screws P fixed on a locking plate 22 thereon are to be screwed off to take the device 2 off.

A second embodiment of the present invention, as shown in FIG. 7, comprises the same main curved guiding plate 20, two extension plates 21, a locking plate 22, and a rear cover plate 23 as the first embodiment does; and besides, two side plates 24 are provided additionally at each outer side of said extension plates 21. A respective side plate 24 has a screw hole 240 on its intermediate portion for a threaded rod 2400 engaging and fitting with a spring 2401 and a stop 2402.

When the second embodiment is mounted on the bed floor A, no screw holes are made necessarily in the pickup body but to screw tightly the threaded rods 2400 through the side plates 24 against the opposite side walls C of a pickup, as shown in FIG. 8. A store space D thus is formed below the main curved guiding plate 20 and among said side plates 24 and the rear cover plate 23. If necessary, a lock E may be placed on top of the rear cover plate 23 to prevent things from being stolen.

The present invention has several advantages as follows.

1. While a pickup is running, the present invention can effectively decrease hampering force and save gasoline accordingly.

2. While a pickup in high-speed running, the present invention can prevent a pickup from swaying.

3. The present invention can fit various pickups by adjusting its width and be easily mounted on or taken off.

4. The space below the main curved guiding plate can be be used for storing things to make use of space.

What is claimed is:

1. An air current guiding device for a pickup comprising:

(a) a main curved guiding plate having an upper smooth curved surface and two opposite sliding straight grooves provided horizontally behind to align with each other;

(b) two extension plates respectively having an upper smooth curved surface as that of said main curved guiding plate and including a block at an intermediate portion to fit and move in a respective said sliding straight groove for said two extension plates to move laterally inwardly or outwardly;

(c) two adjusting members combining with said blocks to stabilize said extension plates and said main curved guiding plate;

(d) a locking plate located below the air current guiding device and lain on a bed floor of the pickup; and (e) a rear cover plate connecting with the rear edge of said main curved guiding plate and said locking plate by two pivots for said rear cover plate to be pulled open;

(f) said two extension plates being moved laterally inwardly or outwardly relative to said air current guiding device to conform to a width of the pickup which this device is applied to.

2. The air current guiding device for the pickup in accordance with claim 1 wherein said blocks of said extension plates have threaded holes respectively for each said adjusting member including a stop, a spring, and a threaded rod to engage and fit through.

3. The air current guiding device for the pickup in accordance with claim 1 wherein a side plate is additionally provided at an outer side of each said extension plate, stands vertically and has a threaded hole through which a threaded rod, a spring, and a stop engage and fix each other tightly on each side wall of the pickup, and space for storage is formed therefore.

* * * * *